US011877663B1

(12) United States Patent
Tan et al.

(10) Patent No.: US 11,877,663 B1
(45) Date of Patent: Jan. 23, 2024

(54) WELDING APPARATUS AND MANUFACTURING METHOD FOR MULTILAYER POCKET SPRING STRING, AND MANUFACTURING DEVICE FOR POCKET SPRING MATTRESS

(71) Applicant: Guangzhou Lianrou Machinery & Equipment Co., Ltd., Guangzhou (CN)

(72) Inventors: Zhiming Tan, Guangzhou (CN); Jie Liang, Guangzhou (CN); Zhiliang Tan, Guangzhou (CN)

(73) Assignee: GUANGZHOU LIANROU MACHINERY & EQUIPMENT CO., LTD., Guangzhou (CN)

( * ) Notice: Subject to any disclaimer, the term of this patent is extended or adjusted under 35 U.S.C. 154(b) by 0 days.

(21) Appl. No.: 18/044,010

(22) PCT Filed: Feb. 7, 2021

(86) PCT No.: PCT/CN2021/075833
§ 371 (c)(1),
(2) Date: Mar. 3, 2023

(87) PCT Pub. No.: WO2022/134286
PCT Pub. Date: Jun. 30, 2022

(30) Foreign Application Priority Data

Dec. 24, 2020 (CN) ......................... 202011573347.7

(51) Int. Cl.
*A47C 27/06* (2006.01)
*B68G 9/00* (2006.01)

(52) U.S. Cl.
CPC .......... *A47C 27/062* (2013.01); *A47C 27/064* (2013.01); *B68G 9/00* (2013.01)

(58) Field of Classification Search
CPC ........ B68G 9/00; A47C 27/064; A47C 27/062
See application file for complete search history.

(56) References Cited

U.S. PATENT DOCUMENTS

| | | | |
|---|---|---|---|
| 5,566,408 | A | 10/1996 | McCarthy et al. |
| 2010/0212090 | A1 | 8/2010 | Stjerna |

(Continued)

FOREIGN PATENT DOCUMENTS

| | | | |
|---|---|---|---|
| CN | 103110296 A | | 5/2013 |
| CN | 105129716 A | * | 12/2015 |

(Continued)

OTHER PUBLICATIONS

Abstract and Allowed Claims for CN112674545B. Publication dated May 3, 2022.

(Continued)

*Primary Examiner* — Vishal I Patel
(74) *Attorney, Agent, or Firm* — M&B IP Analysts, LLC

(57) ABSTRACT

Disclosed are a welding apparatus and manufacturing method for a multilayer pocket spring string, and a manufacturing device for a pocket spring mattress. The welding apparatus may include: at least one first welding module configured for welding cloth, so that an accommodating cavity for accommodating a spring is separated to form at least two layers of first cavities; at least one first driving mechanism configured for driving the first welding module to move along a layer-column direction of the first cavity; a second welding module configured for welding the cloth, so that the cloth forms the accommodating cavities arranged at intervals; and at least two spring conveying mechanisms arranged at intervals, the spring conveying mechanism is configured for clamping and conveying the spring into the corresponding first cavity.

18 Claims, 10 Drawing Sheets

(56) References Cited

U.S. PATENT DOCUMENTS

| | | | |
|---|---|---|---|
| 2015/0308533 A1 | 10/2015 | DeFranks et al. |
| 2019/0274444 A1 | 9/2019 | Grothaus |

FOREIGN PATENT DOCUMENTS

| | | | |
|---|---|---|---|
| CN | 105129716 | A | 12/2015 |
| CN | 105747679 | A | 7/2016 |
| CN | 106419289 | A | 2/2017 |
| CN | 206238918 | U | 6/2017 |
| CN | 206314880 | U | 7/2017 |
| CN | 107616639 | A | 1/2018 |
| CN | 108095934 | A | 6/2018 |
| CN | 110916426 | A | 3/2020 |
| CN | 110973893 | A | 4/2020 |
| CN | 112674545 | B | 5/2022 |
| EP | 3525630 | A1 | 8/2019 |
| FR | 2665154 | A1 | 1/1992 |
| WO | 2018049780 | A1 | 3/2018 |

OTHER PUBLICATIONS

First Office Action for CN202011573347.7 dated Sep. 2, 2021.
Notification to Grant Patent Right for Invention for CN202011573347.7 dated Apr. 1, 2022.
First Search of CN202011573347.7 dated Aug. 23, 2021.
International Search Report for PCT Application No. PCT/CN2021/075833 dated Sep. 29, 2021. The International Bureau of WIPO.
Supplementary Search of CN202011573347.7 dated Mar. 20, 2022.
Written Opinion of the International Searching Authority for PCT Application No. PCT/CN2021/075833 dated Sep. 29, 2021. The International Bureau of WIPO.

* cited by examiner

WELDING APPARATUS AND MANUFACTURING METHOD FOR MULTILAYER POCKET SPRING STRING, AND MANUFACTURING DEVICE FOR POCKET SPRING MATTRESS

CROSS-REFERENCE TO RELATED APPLICATIONS

This application is a national stage filing under 35 U.S.C. § 371 of international application number PCT/CN2021/075833, filed Feb. 7, 2021, which claims priority to Chinese patent application No. 202011573347.7 filed Dec. 24, 2020. The contents of these applications are incorporated herein by reference in their entirety.

TECHNICAL FIELD

The present disclosure relates to the field of pocket spring mattress production and manufacturing technologies, and more particularly, to a welding apparatus and manufacturing method for a multilayer pocket spring string, and a manufacturing device for a pocket spring mattress.

BACKGROUND

Pocket spring is formed by wrapping and packaging a single spring in a cloth pocket, each pocket spring is sequentially connected to form a pocket spring string, and the pocket spring string is arranged and bonded to form a whole, so as to form a single-layer pocket spring bed net. In order to satisfy consumers' different hardness requirements for mattresses, there is currently a pocket spring bed net in a two-layer structure.

The patent CN 206314880 U discloses an integral multilayer pocket spring string having continuous and progressive change of intervals, wherein only a structure of the integral multilayer pocket spring string having continuous and progressive change of intervals is disclosed, but how to manufacture the multilayer pocket spring string having continuous and progressive change is not provided.

The integral multilayer pocket spring string having continuous and progressive change of intervals above comprises a plurality of continuous and independent accommodating cavities formed by cloth and each set of springs wrapped in each accommodating cavity, at least one separation seam is arranged in each accommodating cavity to separate each accommodating cavity to form at least two layers of independent cavities, and the separation seams in two adjacent independent cavities are not on the same horizontal line, so that heights of left and right adjacent independent cavities are not equal. Each spring in each set of springs is laminated and independently wrapped in each corresponding independent cavity.

In the existing technology, two independent single-layer pocket spring strings are bonded and combined together through an adhesive, thereby forming a two-layer pocket spring string. However, it is difficult to achieve an effect of progressive change of the separation seam by forming the multilayer pocket spring string through this method.

SUMMARY

The present disclosure aims to address at least one of the technical problems in the prior art, and provides a welding apparatus and manufacturing method for a multilayer pocket spring string, and a manufacturing device for a pocket spring mattress capable of manufacturing the multilayer pocket spring string having continuous and progressive change of intervals.

According to an embodiment in a first aspect of the present disclosure, a welding apparatus for a multilayer pocket spring string is provided, which includes:

at least one first welding module configured for welding cloth, so that an accommodating cavity for accommodating a spring is separated to form at least two layers of first cavities;

at least one first driving mechanism configured for driving the first welding module to move along a layer-column direction of the first cavity;

a second welding module configured for welding the cloth, so that the cloth forms the accommodating cavities arranged at intervals for accommodating the spring; and at least two spring conveying mechanisms arranged at intervals, wherein the spring conveying mechanism is configured for clamping and conveying the spring into the corresponding first cavity.

The welding apparatus for the multilayer pocket spring string above has at least the following beneficial effects: the cloth is folded and wrapped on the spring conveying mechanism to move, the first driving mechanism drives the first welding module to move progressively, so as to adjust the position of the first welding module, the first welding module welds the cloth to form the separation seam, so that the accommodating cavity is separated to form at least two layers of first cavities, the second welding module welds the cloth, so that the cloth forms the accommodating cavities arranged at intervals, and the position of the separation seam is progressively changed along with the movement of the cloth, thereby manufacturing the multilayer pocket spring string having continuous and progressive change of intervals.

According to the welding apparatus for the multilayer pocket spring string in the embodiment in the first aspect of the present disclosure, the welding apparatus further includes an auxiliary member, the auxiliary member is configured for pressing the cloth, so that the cloth forms a recess at a weld seam in advance, the first welding module includes a first welding head and a second welding head which are cooperated with each other, the first welding head and the second welding head are matched with the recess, and the first welding module welds at a position of the recess to form the weld seam.

According to the welding apparatus for the multilayer pocket spring string in the embodiment in the first aspect of the present disclosure, the welding apparatus further includes a guiding member, the guiding member is arranged between the first welding head and the second welding head, a gap is arranged on the guiding member, the auxiliary member is capable of being partially inserted into the gap, and the guiding member is capable of being selectively extended along a front-back direction.

According to the welding apparatus for the multilayer pocket spring string in the embodiment in the first aspect of the present disclosure, the welding apparatus further includes a supporting member, the first welding module, the guiding member and the auxiliary member are mounted on the supporting member, and the first driving mechanism drives the supporting member to move, so that the first welding module, the auxiliary member and the guiding member move at the same time.

According to the welding apparatus for the multilayer pocket spring string in the embodiment in the first aspect of the present disclosure, the welding apparatus further includes a second driving mechanism, the second driving mechanism is configured for driving the second welding module to move, so that the second welding module clamps and forwardly conveys the cloth by a predetermined distance, and the predetermined distance is a width of the accommodating cavity.

According to the welding apparatus for the multilayer pocket spring string in the embodiment in the first aspect of the present disclosure, one end of the spring conveying mechanism close to the second welding module is provided with a shifting block, and the shifting block is fixedly connected with the second welding module to move up and down and back and forth along with the second welding module, and configured for shifting the spring to move forwardly into the corresponding first cavity.

According to the welding apparatus for the multilayer pocket spring string in the embodiment in the first aspect of the present disclosure, the welding apparatus includes a positioning member, the positioning member is parallel to a conveying direction of the spring conveying mechanism, the positioning member is arranged at a position of a side edge of the cloth, and the positioning member is in an outwardly protruding shape.

According to the welding apparatus for the multilayer pocket spring string in the embodiment in the first aspect of the present disclosure, the welding apparatus includes a third welding module, the third welding module is configured for welding the side edge of the cloth to form a seal, the third welding module is arranged on an outer side the positioning member, and a weld seam formed by welding through the third welding module is parallel to the positioning member.

According to the welding apparatus for the multilayer pocket spring string in the embodiment in the first aspect of the present disclosure, the welding apparatus includes a cutting component, the cutting component is configured for cutting off a redundant edge material, the cutting component includes a cutter and a guiding mechanism, and the guiding mechanism is configured for avoiding the edge material from swinging.

According to the welding apparatus for the multilayer pocket spring string in the embodiment in the first aspect of the present disclosure, the welding apparatus includes a material suction apparatus, the material suction apparatus is configured for sucking the cloth cut off by the cutting component, and the material suction apparatus is arranged below the cutting component.

According to an embodiment in a second aspect of the present disclosure, a manufacturing device for a pocket spring mattress is provided, which includes the welding apparatus for the multilayer pocket spring string above.

According to an embodiment in a third aspect of the present disclosure, a manufacturing method for a multilayer pocket spring string is provided, wherein manufacturing by the welding apparatus for the multilayer pocket spring string above includes:

folding and wrapping the cloth on the spring conveying mechanism to move;

driving, by the first driving mechanism, the first welding module to move progressively, so as to adjust a position of the first welding module;

welding, by the first welding module, the cloth to form a separation seam, so that the accommodating cavity is separated to form at least two layers of first cavities, and progressively changing a position of the separation seam along with a movement of the cloth;

welding, by the second welding module, the cloth, so that the cloth forms the accommodating cavities arranged at intervals;

clamping and conveying, by the spring conveying mechanism, the spring into the corresponding first cavity; and arranging the third welding module, and welding, by the third welding module, the side edge of the cloth to form the seal.

According to the manufacturing method for the multilayer pocket spring string in the embodiment in the third aspect of the present disclosure, the cutting component is arranged to cut off the redundant edge material after the third welding module welds the cloth, the cutting component includes the cutter and the guiding mechanism, and the guiding mechanism guides the moving direction of the edge material, so as to avoid the edge material from swinging.

BRIEF DESCRIPTION OF THE DRAWINGS

The present disclosure is further described hereinafter with reference to the drawings and the embodiments.

Figure 1:
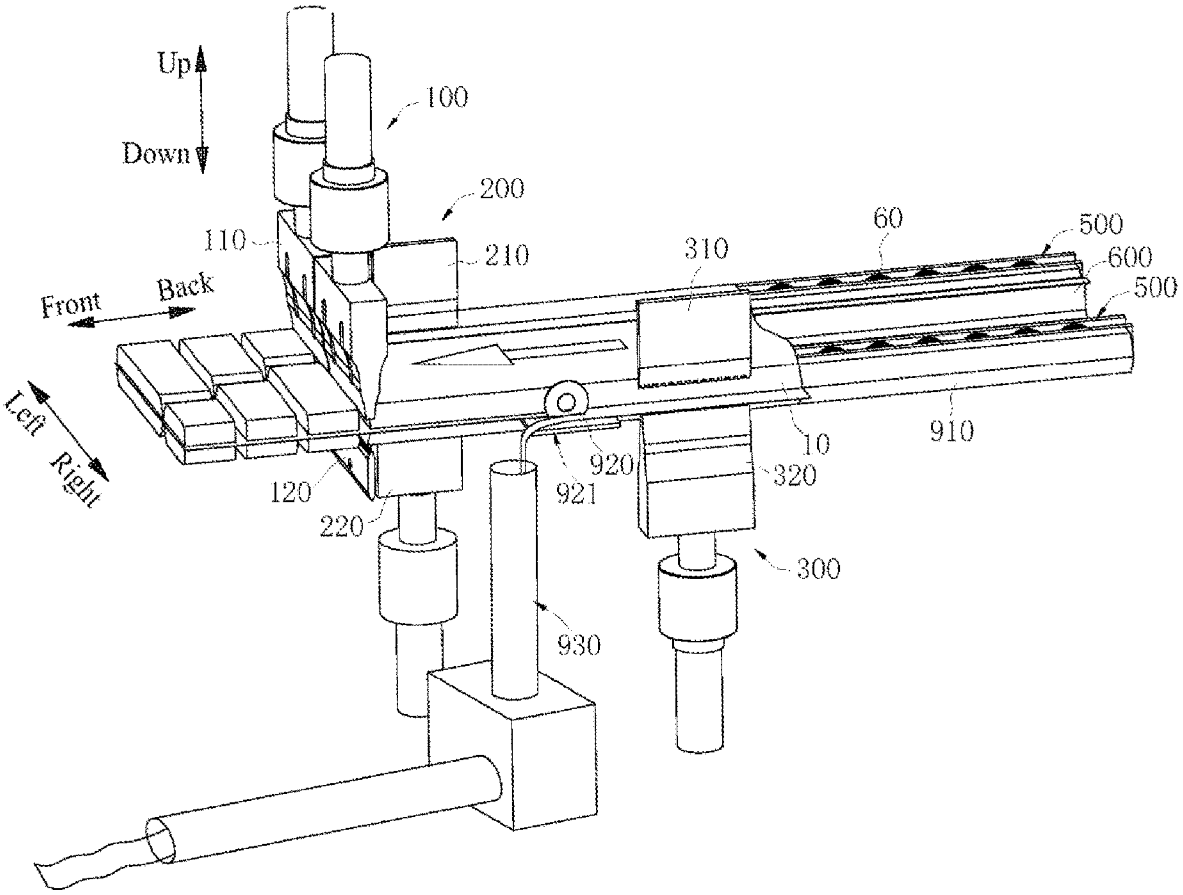
FIG. 1 is a schematic structural diagram of a welding apparatus for a multilayer pocket spring string in an embodiment of the present disclosure.
Figure 2:
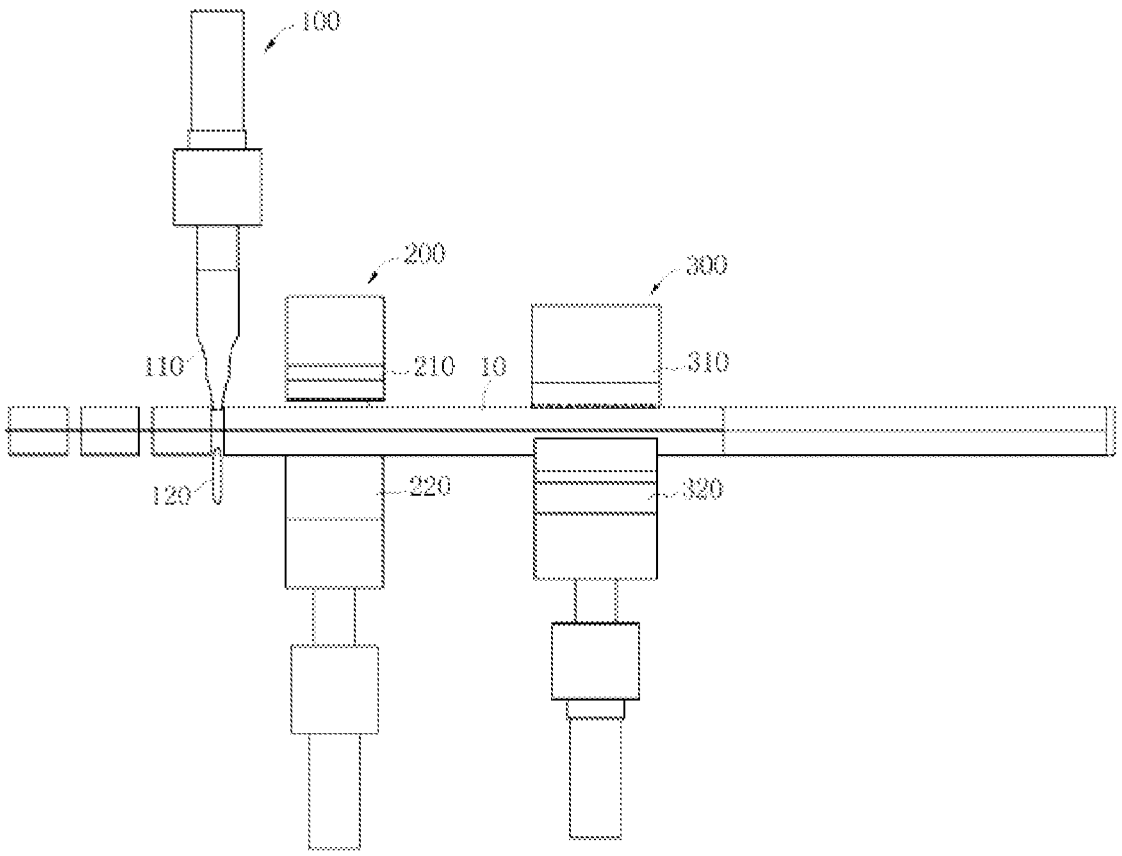
FIG. 2 is a simplified diagram of a front structure of the welding apparatus for the multilayer pocket spring string in the embodiment of the present disclosure.
Figure 3:
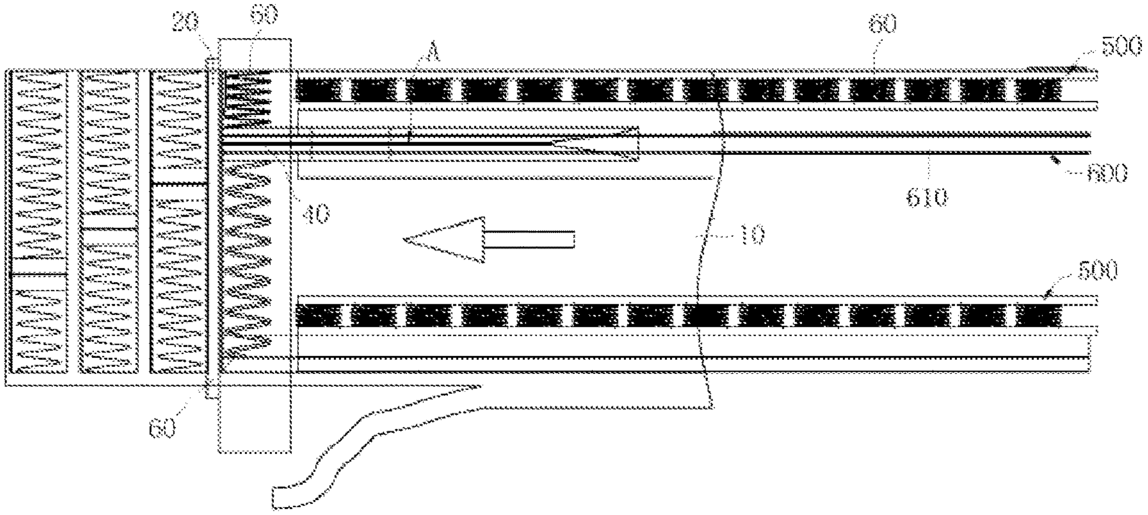
FIG. 3 is a schematic diagram of molding of a two-layer pocket spring string having continuous and progressive change of intervals in the embodiment of the present disclosure.
Figure 4:
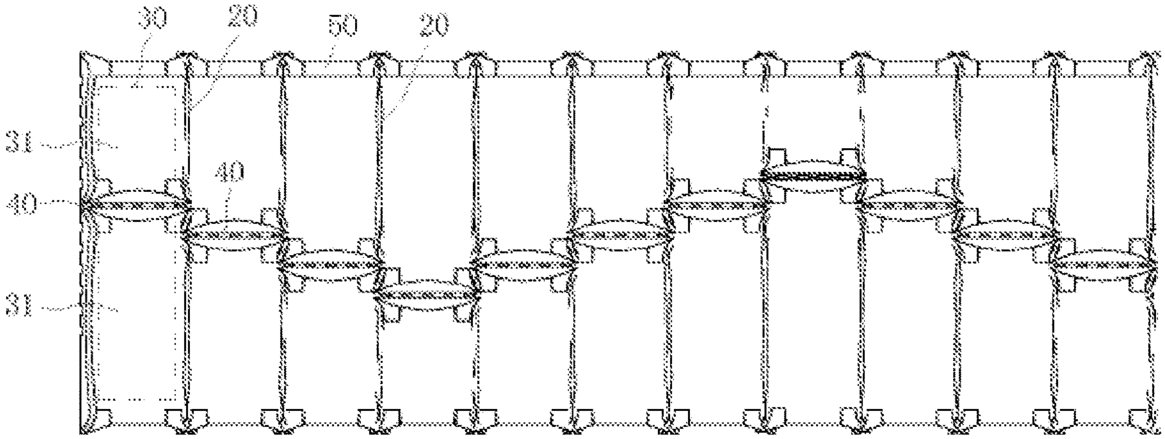
FIG. 4 is a schematic structural diagram of the two-layer pocket spring string having continuous and progressive change of intervals in the embodiment of the present disclosure.
Figure 5:
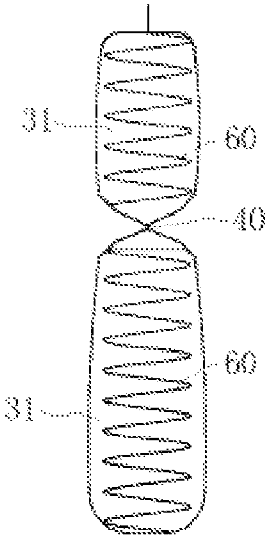
FIG. 5 is a schematic structural diagram of a single two-layer pocket spring in the embodiment of the present disclosure.

Reference numerals: 100 refers to second welding module, 110 refers to third welding head, 120 refers to fourth welding head, 200 refers to first welding module, 210 refers to first welding head, 220 refers to second welding head, 300 refers to third welding module, 310 refers to fifth welding head, 320 refers to sixth welding head, 400 first driving mechanism, 410 refers to motor and reducer, 420 refers to rotating wheel, 421 refers to sliding groove, 430 refers to connecting rod, 500 refers to spring conveying mechanism, 510 refers to conveying member, 520 refers to shifting block, 600 refers to guiding member, 610 refers to gap, 620 refers to first plate member, 700 refers to auxiliary member, 810 refers to base, 820 refers to sliding seat, 830 refers to sliding rail, 840 refers to sliding block, 850 refers to support seat, 860 refers to connecting member, 870 refers to guiding member mounting seat, 880 refers to connecting seat, 910 refers to positioning member, 920 refers to cutter, 921 refers to guiding mechanism, 930 refers to material suction apparatus, 10 refers to cloth, 20 refers to first weld seam, 30 refers to accommodating cavity, 31 refers to first cavity, 40 refers to separation seam, 50 refers to second weld seam, and 60 refers to spring.

DETAILED DESCRIPTION

Specific embodiments of the present disclosure will be described in detail in this part, preferred embodiments of the present disclosure are shown in the drawings, and the drawings are intended to supplement the description in the written part of the specification with figures, so that people can intuitively and vividly understand each technical feature and the overall technical solution of the present disclosure, but it cannot be understood as a limitation to the scope of protection of the present disclosure.

In the description of the present disclosure, it should be understood that, the orientation or position relationship related to the orientation description, such as the orientation or position relationship indicated by the terms "upper", "lower", "front", "rear", "left", "right", and the like is based on the orientation or position relationship shown in the drawings, which is only used for convenience of the description of the present disclosure and simplification of the description instead of indicating or implying that the indicated device or element must have a specific orientation, and be constructed and operated in a specific orientation, and thus should not be understood as a limitation to the present disclosure.

In the description of the present disclosure, the meaning of several refers to being one or more, and the meaning of multiple refers to being more than two. The meanings of greater than, less than, more than, etc., are understood as not including this number, while the meanings of above, below, within, etc., are understood as including this number. If there is the description of first and second, it is only for the purpose of distinguishing technical features, and should not be understood as indicating or implying relative importance, implicitly indicating the number of the indicated technical features or implicitly indicating the order of the indicated technical features.

In the description of the present disclosure, unless otherwise explicitly defined, the terms "setting", "mounting" and "connecting" should be understood a broad sense, and those skilled in the art can reasonably determine the specific meanings of the above terms in the present disclosure in combination with the specific contents of the technical solution.

Referring to FIG. 1 to FIG. 8, an embodiment of the present disclosure provides a welding apparatus for a multilayer pocket spring string, which comprises a first welding module 200, a second welding module 100, a first driving mechanism 400 and two spring conveying mechanisms 500 arranged at an interval.

The spring conveying mechanism 500 clamps and forwardly conveys a spring 60, and cloth 10 is folded and wrapped on the spring conveying mechanism 500 to move. The first driving mechanism 400 drives the first welding module 200 to move progressively along a left-right direction, so as to adjust a position of the first welding module 200, and the first welding module 200 welds the cloth 10 to form a separation seam 40, so that an accommodating cavity for accommodating the spring 60 is separated to form two layers of first cavities 31 (equivalent to independent cavities in the patent CN 206314880 U). The spring conveying mechanism 500 corresponds to the first cavity 31, each spring conveying mechanism 500 conveys the spring 60, so as to load the spring 60 into the corresponding first cavity 31, and the spring 60 is stretched and unfolded. The cloth 10 moves forwardly, and the second welding module 100 welds the cloth 10 to form a first weld seam 20, so that the cloth 10 forms the accommodating cavities 30 arranged at intervals, and the second welding module 100 and the first welding module 200 are perpendicular to each other. With a movement of the cloth 10, a position of the separation seam 40 is progressively changed and adjusted, such as a change roughly in an S-shaped curve, thereby manufacturing the multilayer pocket spring string having continuous and progressive change of intervals. Moreover, compared with a traditional bonding method, a production efficiency can be improved and a production cost can be reduced.

It can be understood that the spring conveying mechanism 500 clamps and conveys the spring 60, and may have different structures as long as the spring 60 can be conveyed.

Figure 10:
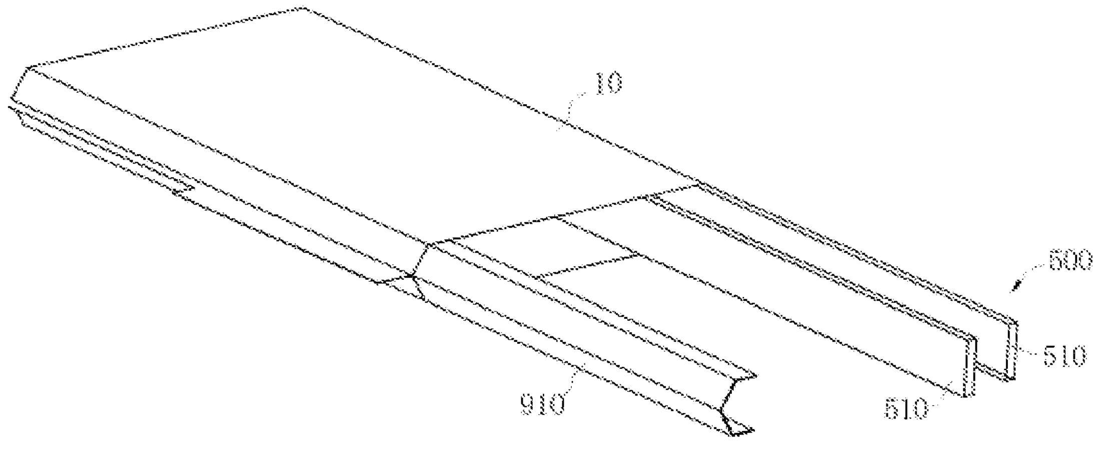
FIG. 10 is a schematic structural diagram of a positioning member and the spring conveying mechanism in the embodiment of the present disclosure.

Referring to FIG. 10, in some embodiments, the spring conveying mechanism 500 comprises two conveying members 510 arranged at an interval, and the two conveying members 510 clamp and convey the spring 60. Specifically, the conveying member 510 may be an ordinary conveyor belt, a flexible conveyor belt or a chain.

Figure 6:
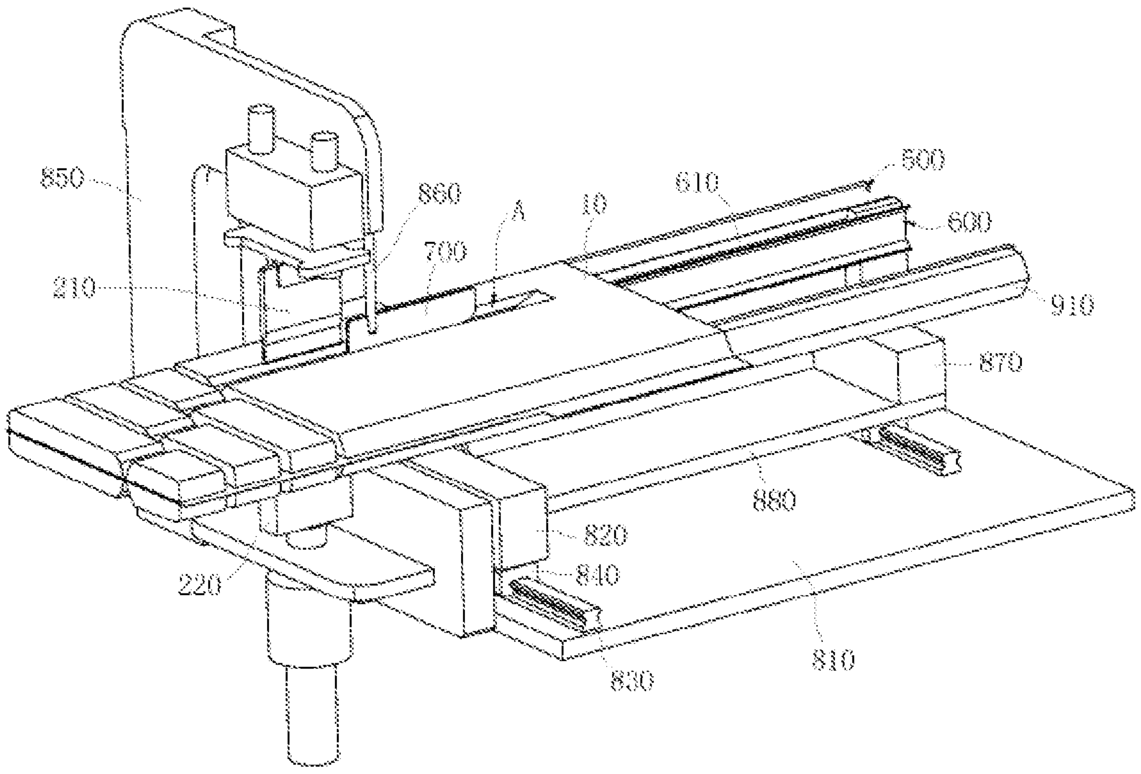
FIG. 6 is a schematic structural diagram of welding of a first welding module in the embodiment of the present disclosure.
Figure 7:
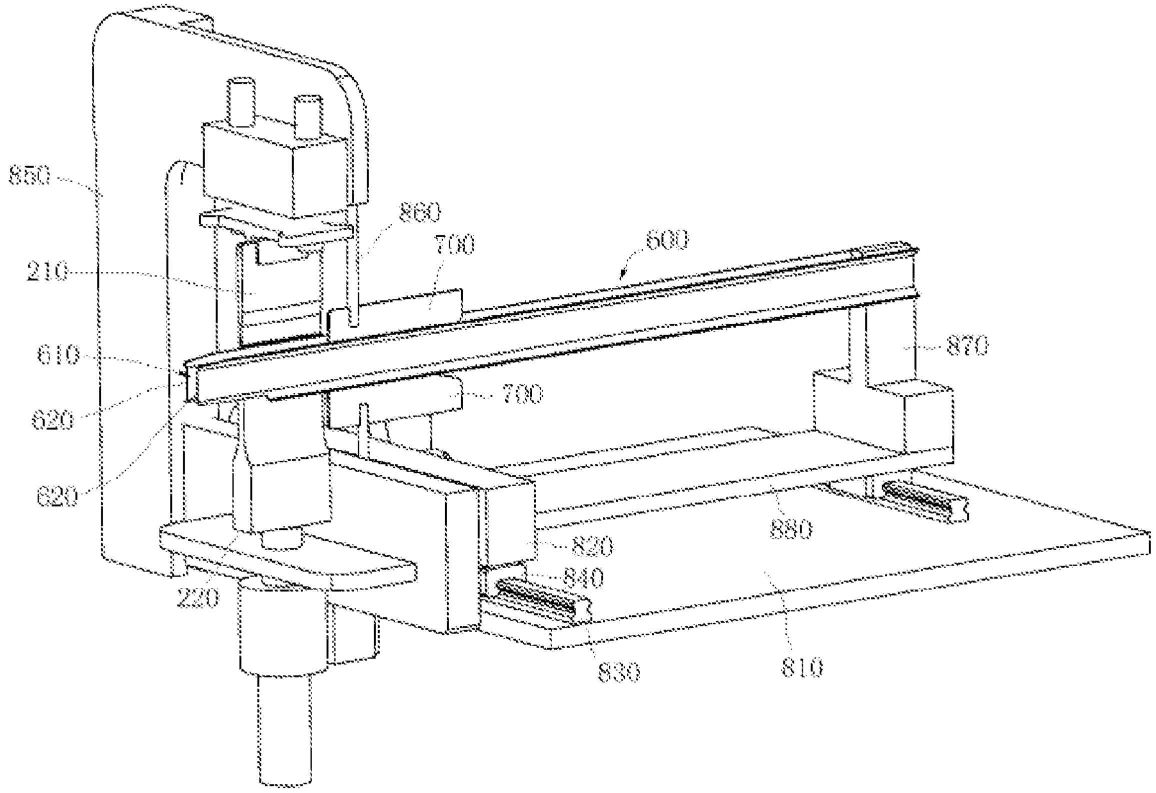
FIG. 7 is a schematic structural diagram of the first welding module, a guiding member and an auxiliary member in the embodiment of the present disclosure.

Referring to FIG. 6 and FIG. 7, in the embodiment, the welding apparatus further comprises an auxiliary member 700, and the auxiliary member 700 is configured for pressing the cloth 10, so that the cloth 10 forms a recess (referring to a part A in FIG. 3 and FIG. 6) at a weld seam, which is specifically a separation seam 40 in advance. The first welding module 200 comprises a first welding head 210 and a second welding head 220 which are cooperated with each other, the first welding head 210 and the second welding head 220 are matched with the recess, and corresponding to a position of the recess, the first welding head 210 and the second welding head 220 weld at the recess to form the weld seam. The auxiliary member 700 forms the recess at the separation seam 40 in advance, which facilitates a cutting-in action of the first welding head 210 and the second welding head 220, thereby welding more firmly. Moreover, since a welding action of the first welding head 210 and the second welding head 220 is faster and stronger, the cloth 10 forms the recess in advance, so as to well avoid the first welding head 210 or the second welding head 220 from breaking the cloth 10.

In some embodiments, the welding apparatus further comprises a guiding member 600, and the guiding member 600 is arranged between the first welding head 210 and the second welding head 220. A gap 610 is arranged on the guiding member 600 for guiding the auxiliary member 700 to press the cloth 10 so as to form the separation seam 40, the auxiliary member 700 is partially inserted into the gap 610, and a position of the gap 610 is a position where the separation seam 40 is formed, so as to avoid an error between a position of the weld seam of the first welding head 210 and the second welding head 220 and a predetermined position, thereby improving a welding accuracy.

It can be understood that the guiding member 600 may be selectively provided, which means that the guiding member 600 may not be provided, but only the auxiliary member 700 is provided.

Specifically, the guiding member 600 comprises two first plate members 620 arranged in parallel at an interval, upper and lower ends of the two first plate members 620 are bent to form an inverted V-shaped guiding opening, the first plate member 620 is in a long strip shape, and the guiding member 600 is arranged between two spring conveying mechanisms 500. The auxiliary member 700 is a plate member, and two auxiliary members 700 are provided, and respectively arranged above and below the guiding member 600. The guiding member 600 is penetrated into the folded cloth 10 first, then the auxiliary member 700 is mounted, and the auxiliary member 700 is partially inserted into the gap 610 of the guiding member 600.

It can be understood that the gap 610 of the guiding member 600 may be selectively extended along a front-back direction, with an extension length set as required. In the embodiment, the gap 610 is extended to the second welding module 100.

In some embodiments, the welding apparatus further comprises a supporting member, the first welding module 200, the guiding member 600 and the auxiliary member 700 are mounted on the supporting member, and the first driving mechanism 400 drives the supporting member to move, so that the first welding module 200, the auxiliary member 700 and the guiding member 600 move along a left-right direction at the same time.

Specifically, the supporting member comprises a support seat 850, a connecting seat 880, a guiding member mounting seat 870 and a sliding seat 820. The first driving mechanism 400 is provided with a base 810, the sliding seat 820 is arranged on the base 810, and the sliding seat 820 is slidably connected with the base 810. A sliding rail 830 is mounted on the base 810, a sliding block 840 matched with the sliding rail 830 is mounted at a bottom portion of the sliding seat 820, and the sliding block and the sliding seat 820 are fixedly connected with the support seat 850. The first welding head 210 is mounted on an upper portion of the support seat 850, the second welding head 220 is mounted on a lower portion of the support seat 850, and the first welding head 210 and the second welding head 220 may move up and down. Two auxiliary members 700 are respectively connected with the support seat 850 through the connecting member 860, a side surface of the sliding seat 820 is connected with the connecting seat 880, the guiding member mounting seat 870 is arranged on the connecting seat 880, and one end of the guiding member 600 is fixed on the guiding member mounting seat 870. In this way, the first driving mechanism 400 drives the sliding seat 820 to move, which means that the first welding module 200, the guiding member 600 and the auxiliary member 700 may be driven to move at the same time.

It can be understood that the first driving mechanism 400 may have different structures, as long as linear reciprocation can be realized. For example, a screw-nut transmission mechanism, a gear-rack transmission mechanism, or an air cylinder telescopic apparatus may be employed.

Figure 8:
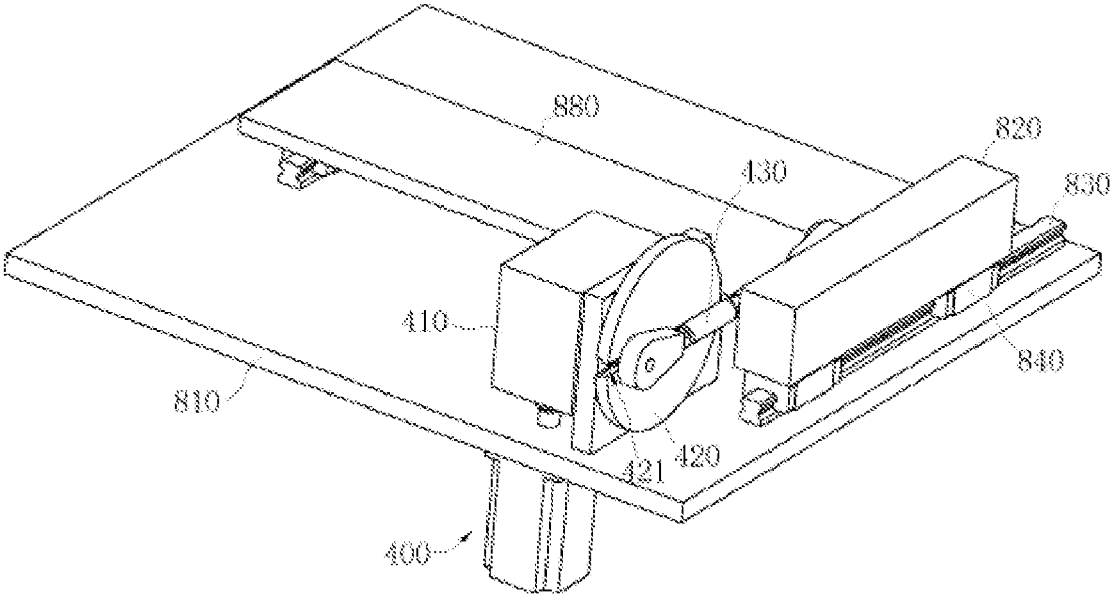
FIG. 8 is a schematic structural diagram of a first driving mechanism in the embodiment of the present disclosure.

Referring to FIG. 8, in some embodiments, the first driving mechanism 400 is a connecting rod mechanism, and comprises a motor and a reducer 410, a rotating wheel 420 and a connecting rod 430. A sliding groove 421 is arranged on the rotating wheel 420, and a shaft member is slidably connected with the sliding groove 421. Specifically, the shaft member may be a bolt, the shaft member is rotatably connected with one end of the connecting rod 430, and the other end of the connecting rod 430 is rotatably connected with the sliding seat 820. In this way, the motor drives the rotating wheel 420 to rotate, the sliding seal 820 is driven to move through transmission of the connecting rod mechanism, and every time the rotating wheel 420 rotates by an angle, the sliding seat 820 moves progressively by a short distance. A position of the shaft member is adjusted along the sliding groove 421, which may adjust and drive a reciprocation stroke of the sliding seat 840, thereby adjusting left and right extreme positions of the separation seam.

It can be understood that the auxiliary member 700 is partially inserted into the gap 610 of the guiding member 600, and the auxiliary member 700 may be selectively set to be vertically adjusted, so that a distance of the auxiliary member 700 inserted into the guiding member 600 may be adjusted.

In the embodiment, the welding apparatus further includes a second driving mechanism (not shown). The second welding module 100 comprises a third welding head 110 and a fourth welding head 120 which are matched with each other, and the third welding head 110 and the fourth welding head 120 may move up and down. The second driving mechanism is configured for driving the second welding module 100 to move, so that after the third welding head 110 and the fourth welding head 120 finish welding, the cloth 10 is clamped and forwardly conveyed by a predetermined distance, thereby forwardly conveying the cloth 10. Specifically, the predetermined distance is a width of the accommodating cavity 30. Every time the cloth 10 is forwardly conveyed by the predetermined distance, the second welding module 100 welds once, and a plurality of accommodating cavities 30 arranged at continuous intervals are formed in the cloth 10.

It can be understood that the second driving mechanism may have different structures, as long as the second welding module 100 can be driven to reciprocate linearly.

Certainly, it can be understood that, as an alternative solution, the second driving mechanism may not be provided to drive the second welding module 100, but a driving mechanism may be additionally provided to directly drive the cloth to move.

Figure 9:
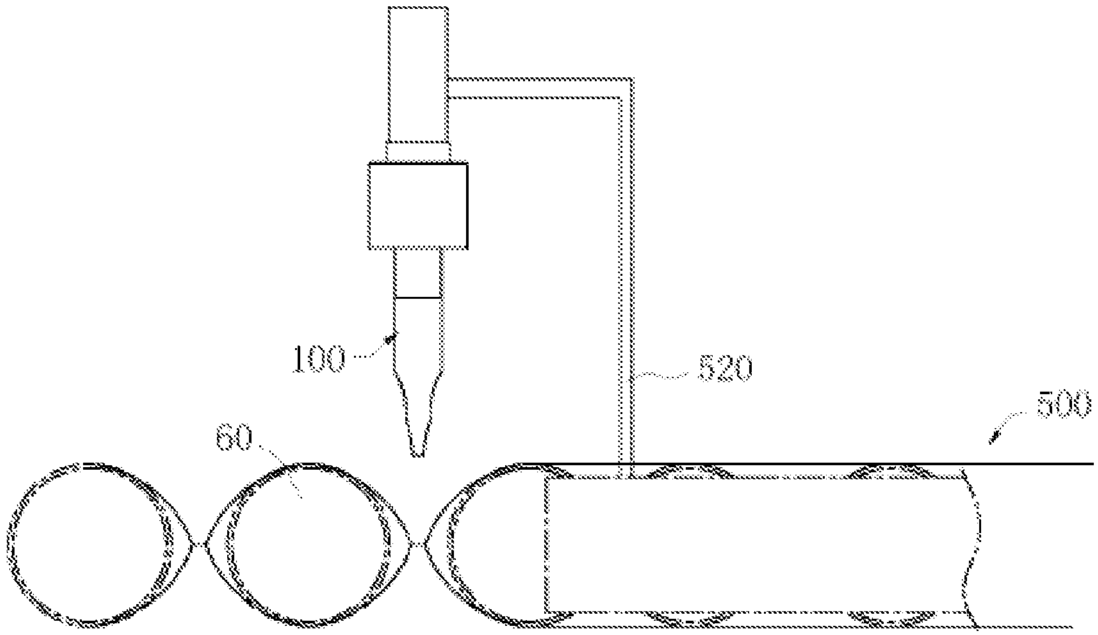
FIG. 9 is a schematic structural diagram of a front end of a spring conveying mechanism in the embodiment of the present disclosure.

Referring to FIG. 9, in some embodiments, one end, which is namely a front end, of the spring conveying mechanism 500 close to the second welding module 100 is provided with a shifting block 520, the shifting block 520 is set to move up and down and back and forth, and the shifting block 520 shifts the spring 60 to move forwardly, so as to load the spring 60 into the first cavity 31.

It can be understood that each spring conveying mechanism 500 may be correspondingly provided with one shifting block 520, and the shifting block 520 simultaneously shifts the spring 60 to load the spring into the corresponding first cavity 31.

In some embodiments, the shifting block 520 is fixedly connected with the second welding module 100, the shifting block 520 moves up and down and back and forth along with the second welding module 100, and the second driving mechanism drives the second welding module 100 and the shifting block 520 to move at the same time. When one shifting block 520 is provided, the shifting block may be arranged at a position above or below a front end of the spring conveying mechanism 500. Or, when two shifting blocks 520 are provided, the shifting blocks are respectively arranged at positions above and below.

Referring to FIG. 1 to FIG. 5, in the embodiment, the welding apparatus comprises a third welding module 300, and the third welding module 300 comprises a fifth welding head 310 and a sixth welding head 320. The cloth 10 is folded in a U shape, the third welding module 300 is configured for welding a side edge of the cloth 10 to form a seal, the third welding module 300 is arranged at an upstream position of the second welding module 100 and the first welding module 200 along a conveying direction of the cloth 10, and the third welding module 300 welds to form a second weld seam 50.

In some embodiments, the welding apparatus comprises a positioning member 910, the positioning member 910 is in a long strip shape, the positioning member 910 is parallel to the conveying direction of the spring conveying mechanism 500, and the positioning member 910 is arranged at a position of the seal of the side edge of the cloth 10. The cloth 10 wraps the positioning member 910, and a convex shape is formed on an outer side the positioning member 910, which facilitates welding by the third welding module 300. The third welding module 300 is arranged on an outer side the positioning member 910, and the second weld seam 50 formed by welding is parallel to the positioning member 910. Referring to FIG. 10, specifically, the positioning member 910 is bent to form a symmetrically inclined and outwardly convex shape.

In some embodiments, the welding apparatus comprises a cutting component and a material suction apparatus 930, wherein the cutting component cuts off a redundant edge material after welding by the third welding module 300, and the cutting component comprises a cutter 920 and a guiding mechanism 921. The guiding mechanism 921 is configured for avoiding the edge material from swinging during cutting. Specifically, the guiding mechanism 921 may be upper and lower guiding blocks, a small-distance gap is formed between the two guiding blocks for the cloth to penetrate through, so as to keep the cloth straight, and a notch for the cutter 920 to penetrate through is arranged on the guiding block. Or, the guiding mechanism may be two guiding wheels arranged up and down, and other structures. The material suction apparatus 930 is arranged below the cutting component and sucks the cloth 10 cut off by the cutting component, so as to avoid the cloth 10 from scattering on the ground. Specifically, the material suction apparatus 930 may comprise a material suction pipe, and the material suction pipe is connected with a vacuum generator, so that a negative pressure is formed inside the material suction pipe, thereby providing a suction force to suck the cloth 10 cut off.

Figure 11:
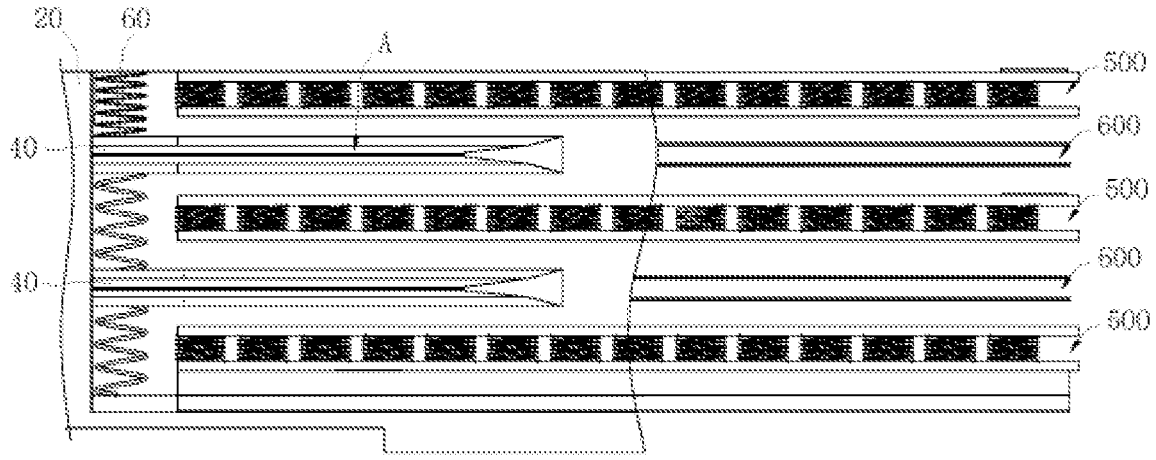
FIG. 11 is a schematic diagram of molding of a three-layer pocket spring string having continuous and progressive change of intervals in the embodiment of the present disclosure.
Figure 12:
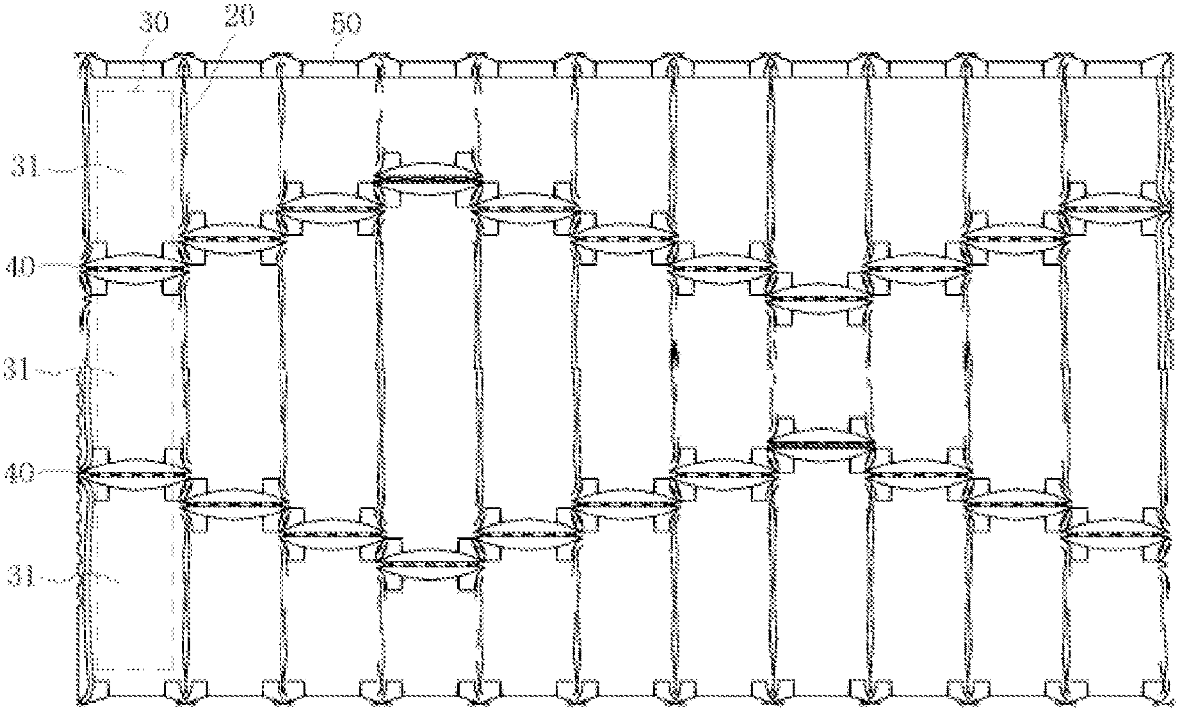
FIG. 12 is a schematic structural diagram of the three-layer pocket spring string having continuous and progressive change of intervals in the embodiment of the present disclosure.
Figure 13:
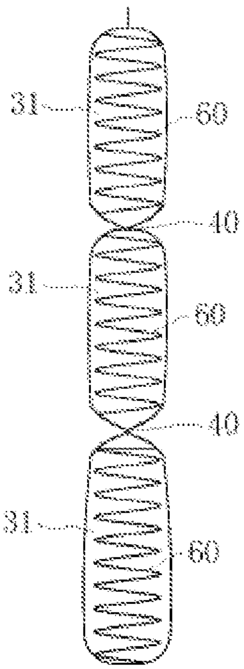
FIG. 13 is a schematic structural diagram of a single three-layer pocket spring in the embodiment of the present disclosure.

It can be understood that the first welding module 200 welds one separation seam 40, and the accommodating cavity 30 is separated to form two layers of first cavities 31. A plurality of separation seams 40 may be welded in the accommodating cavity 30, so as to form more than three layers of first cavities 31. Accordingly, a plurality of first welding modules 200, a plurality of first driving mechanisms 400, a plurality of guiding members 600, a plurality of auxiliary members 700 and a plurality of spring conveying mechanisms 500 may be provided. For example, referring to FIG. 11 to FIG. 13, two separation seams 40 are welded in the accommodating cavity 30, two first welding modules 200, two first driving mechanisms 400, two guiding members 600 and two auxiliary members 700 are correspondingly provided, three layers of first cavities 31 are formed in the accommodating cavity 30, and three spring conveying mechanisms 500 are correspondingly provided. Similarly, according to this principle, more than three guiding members 600 and more than three auxiliary members 700 may be provided, so as to divide the cloth into more layers of pocket spring strings.

The embodiment of the present disclosure further provides a manufacturing device for a pocket spring mattress, which comprises the welding apparatus for the multilayer pocket spring string above. The manufacturing device for the pocket spring mattress which comprises the welding apparatus for the multilayer pocket spring string above can produce a spring mattress with progressive change of hardness, thereby making the mattress more comfortable.

The embodiment of the present disclosure further provides a manufacturing method for a multilayer pocket spring string, wherein manufacturing by the welding apparatus for the multilayer pocket spring string above comprises the following steps of:

- S100: folding and wrapping the cloth 10 on the spring conveying mechanism 500 and the positioning member 910 to move;
- S200: welding, by the third welding module 300, the side edge of the cloth 10 to form the second weld seam 50, and sealing the cloth 10;
- S300: driving, by the first driving mechanism 400, the first welding module 200 to move progressively along a length direction of the accommodating cavity 30, so as to adjust a position of the first welding module 200;
- S400: welding, by the first welding module 200, the cloth 10 to form the separation seam so that the accommodating cavity 30 is separated to form at least two layers of first cavities 31;
- S500: clamping and conveying, by the spring conveying mechanism 500, the spring 60, and loading the spring 60 into the corresponding first cavity 31 through the shifting block 520;
- S600: welding, by the second welding module 100, the cloth 10 to form the first weld seam 20, so that the cloth forms the accommodating cavities arranged at intervals, and packaging a single packet spring;
- S700: driving, by the second driving mechanism, the second welding module 100 to move forwardly by the predetermined distance, wherein the predetermined distance is the width of the accommodating cavity 30; and
- S800: cutting off, by the cutting component, the redundant edge material, wherein a moving direction of the edge material is guided by the guiding mechanism 921, so as to avoid the edge material from swinging, and sucking, by the material suction apparatus 930, the cloth 10 cut off.

The steps S200 to S800 are repeated. With the movement of the cloth 10, the plurality of accommodating cavities 30 arranged at continuous intervals are formed inside the cloth 10, and meanwhile, the position of the separation seam 40 is progressively changed, so as to obtain the multilayer pocket spring string having continuous and gradual change of intervals.

The embodiments of the present disclosure are described in detail with reference to the drawings above, but the present disclosure is not limited to the above embodiments, and various changes may also be made within the knowledge scope of those of ordinary skills in the art without departing from the scope of the present disclosure.

What is claimed is:

1. A welding apparatus for a multilayer pocket spring string, comprising:

at least one first welding module configured for welding cloth, so that an accommodating cavity for accommodating a spring is separated to form at least two layers of first cavities;

at least one first driving mechanism configured for driving the first welding module to move along a layer-column direction of the first cavity;

a second welding module configured for welding the cloth, so that the cloth forms the accommodating cavities arranged at intervals; and at least two spring conveying mechanisms arranged at intervals, wherein the spring conveying mechanism is configured for clamping and conveying the spring into the corresponding first cavity;

the welding apparatus further comprises a second driving mechanism or driving mechanism, the second driving mechanism is configured for driving the second welding module to move, so that the second welding module clamps and forwardly conveys the cloth by a predetermined distance, and wherein the predetermined distance is a width of the accommodating cavity; the driving mechanism is configured to move the cloth directly.

2. The welding apparatus of claim 1, wherein the welding apparatus further comprises an auxiliary member, the auxiliary member is configured for pressing the cloth, so that the cloth forms a recess at a weld seam in advance, the first welding module comprises a first welding head and a second welding head which are cooperated with each other, the first welding head and the second welding head are matched with the recess, and the first welding module is configured to weld at the recess to form the weld seam.

3. The welding apparatus of claim 2, wherein the welding apparatus further comprises a guiding member, the guiding member is arranged between the first welding head and the second welding head, a gap is arranged on the guiding member, the auxiliary member is capable of being partially inserted into the gap, and the guiding member is capable of being selectively extended along a front-back direction.

4. The welding apparatus of claim 3, wherein the welding apparatus further comprises a supporting member, the first welding module, the guiding member and the auxiliary member are mounted on the supporting member, and the first driving mechanism is configured to drive the supporting member to move, so that the first welding module, the auxiliary member and the guiding member move at the same time.

5. The welding apparatus of claim 1, wherein one end of the spring conveying mechanism close to the second welding module is provided with a shifting block, and the shifting block is fixedly connected with the second welding module to move up and down and back and forth along with the second welding module, and configured for shifting the spring to move forwardly into the corresponding first cavity.

6. The welding apparatus of claim 1, wherein the welding apparatus comprises a positioning member, the positioning member is parallel to a conveying direction of the spring conveying mechanism, the positioning member is arranged at a position of a side edge of the cloth, and the positioning member is in an outwardly protruding shape.

7. The welding apparatus of claim 6, wherein the welding apparatus comprises a third welding module, the third welding module is configured for welding the side edge of the cloth to form a seal, the third welding module is arranged on an outer side the positioning member, and a weld seam formed by welding through the third welding module is parallel to the positioning member.

8. The welding apparatus of claim 1, wherein the welding apparatus comprises a cutting component, the cutting component is configured for cutting off a redundant edge material, the cutting component comprises a cutter and a guiding mechanism, and the guiding mechanism is configured for guiding a moving direction of the edge material, so as to avoid the edge material from swinging.

9. The welding apparatus of claim 8, wherein the welding apparatus comprises a material suction apparatus, the material suction apparatus is configured for sucking the cloth cut off by the cutting component, and the material suction apparatus is arranged below the cutting component.

10. A manufacturing device for a pocket spring mattress, comprising the welding apparatus of claim 1.

11. A manufacturing method for the multilayer pocket spring string, manufacturing by the welding apparatus of claim 1, wherein the manufacturing method comprises:

folding and wrapping the cloth on the spring conveying mechanism to move;

driving, by the first driving mechanism, the first welding module to move progressively, so as to adjust a position of the first welding module;

welding, by the first welding module, the cloth to form a separation seam, so that the accommodating cavity is separated to form at least two layers of first cavities, and progressively changing a position of the separation seam along with a movement of the cloth;

welding, by the second welding module, the cloth, so that the cloth forms the accommodating cavities arranged at intervals;

clamping and conveying, by the spring conveying mechanism, the spring into the corresponding first cavity; and arranging a third welding module, and welding, by the third welding module, a side edge of the cloth to form a seal.

12. The manufacturing method of claim 11, wherein a cutting component is arranged to cut off a redundant edge material after the third welding module welds the cloth, the cutting component comprises a cutter and a guiding mechanism, and the guiding mechanism guides a moving direction of the edge material, so as to avoid the edge material from swinging.

13. The welding apparatus of claim 2, wherein the welding apparatus comprises a cutting component, the cutting component is configured for cutting off a redundant edge material, the cutting component comprises a cutter and a guiding mechanism, and the guiding mechanism is configured for guiding a moving direction of the edge material, so as to avoid the edge material from swinging.

14. The welding apparatus of claim 3, wherein the welding apparatus comprises a cutting component, the cutting component is configured for cutting off a redundant edge material, the cutting component comprises a cutter and a guiding mechanism, and the guiding mechanism is configured for guiding a moving direction of the edge material, so as to avoid the edge material from swinging.

15. The welding apparatus of claim 4, wherein the welding apparatus comprises a cutting component, the cutting component is configured for cutting off a redundant edge material, the cutting component comprises a cutter and a guiding mechanism, and the guiding mechanism is configured for guiding a moving direction of the edge material, so as to avoid the edge material from swinging.

16. The welding apparatus of claim 5, wherein the welding apparatus comprises a cutting component, the cutting component is configured for cutting off a redundant edge material, the cutting component comprises a cutter and a guiding mechanism, and the guiding mechanism is configured for guiding a moving direction of the edge material, so as to avoid the edge material from swinging.

17. The welding apparatus of claim 6, wherein the welding apparatus comprises a cutting component, the cutting component is configured for cutting off a redundant edge material, the cutting component comprises a cutter and a guiding mechanism, and the guiding mechanism is configured for guiding a moving direction of the edge material, so as to avoid the edge material from swinging.

18. The welding apparatus of claim 7, wherein the welding apparatus comprises a cutting component, the cutting component is configured for cutting off a redundant edge material, the cutting component comprises a cutter and a guiding mechanism, and the guiding mechanism is configured for guiding a moving direction of the edge material, so as to avoid the edge material from swinging.

* * * * *